United States Patent [19]
Hinson et al.

[11] Patent Number: 6,134,363
[45] Date of Patent: Oct. 17, 2000

[54] METHOD FOR ACCESSING OPTICAL FIBERS IN THE MIDSPAN REGION OF AN OPTICAL FIBER CABLE

[75] Inventors: Al Hinson; Peter Elisson, both of Hickory, N.C.

[73] Assignee: Alcatel, Paris, France

[21] Appl. No.: 09/252,134

[22] Filed: Feb. 18, 1999

[51] Int. Cl.[7] ...................................................... G02B 6/44
[52] U.S. Cl. ............................................ 385/100; 385/113
[58] Field of Search .......................... 385/86, 100, 101, 385/109, 113, 114, 135, 134

[56] References Cited

U.S. PATENT DOCUMENTS

| | | |
|---|---|---|
| 2,120,398 | 6/1938 | Edwards et al. . |
| 3,375,579 | 4/1968 | Slonksnes . |
| 3,902,206 | 9/1975 | Naquin . |
| 4,026,017 | 5/1977 | Arnold . |
| 4,434,554 | 3/1984 | Korbelak . |
| 4,619,387 | 10/1986 | Shank et al. . |
| 4,640,009 | 2/1987 | Liversidge . |
| 4,741,104 | 5/1988 | Noon . |
| 4,972,581 | 11/1990 | McCollum et al. . |
| 5,050,302 | 9/1991 | Mills . |
| 5,085,114 | 2/1992 | DeRoss et al. . |
| 5,093,992 | 3/1992 | Temple, Jr. et al. . |
| 5,140,751 | 8/1992 | Faust . |
| 5,359,690 | 10/1994 | Kaizu et al. . |
| 5,443,536 | 8/1995 | Kiritsy et al. . |
| 5,732,471 | 3/1998 | Korinek et al. . |
| 6,035,088 | 3/2000 | Chandraiah et al. ................... 385/114 |

*Primary Examiner*—Phan T. H. Palmer
*Attorney, Agent, or Firm*—Ware, Fressola, Van der Sluys & Adolphson LLP

[57] ABSTRACT

A method for accessing optical fibers in a midspan region of an optical fiber cable is disclosed. The method of the present invention begins by providing an optical fiber cable having at least one optical fiber disposed within a channel defined by a jacket, the jacket having two reinforcing rods embedded therein. Next, the jacket material adjacent to the reinforcing rods is removed to partially expose the reinforcing rods. Then, the jacket material is cut substantially semi-circumferentially between the reinforcing rods at a leading position. Finally, the jacket material is pulled at the leading position radially away from the cable so as to cause the jacket material disposed between the reinforcing rods and the channel to separate. This will permit access to the optical fibers disposed in the jacket through an opening resulting from the separation of the jacket material.

12 Claims, 6 Drawing Sheets

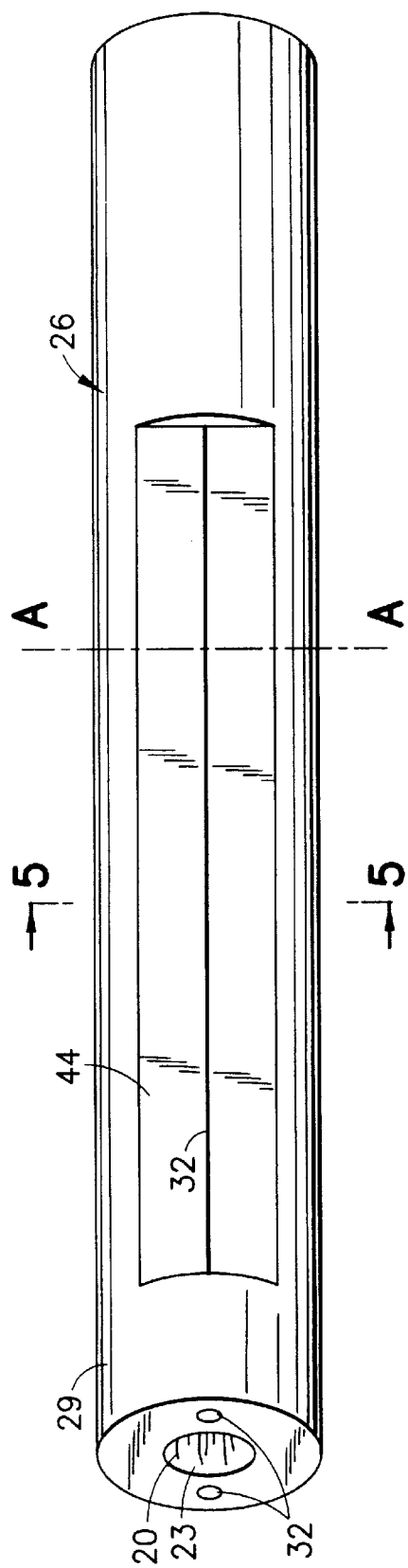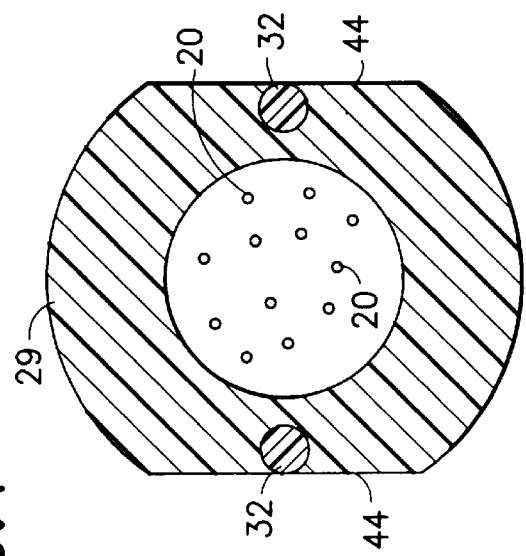

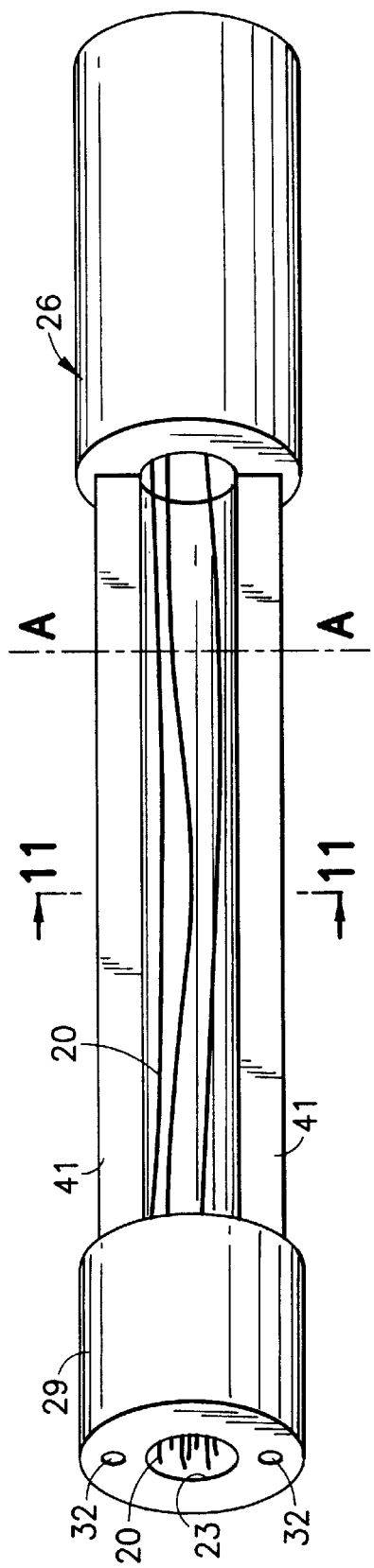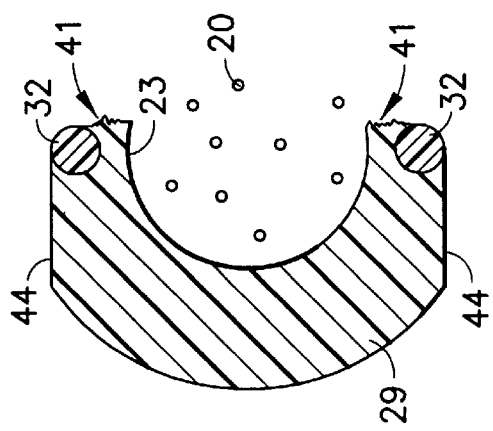

METHOD FOR ACCESSING OPTICAL FIBERS IN THE MIDSPAN REGION OF AN OPTICAL FIBER CABLE

BACKGROUND OF THE INVENTION

1. Field of the Invention

The present invention relates generally to a method for accessing optical fibers in an optical fiber cable. More particularly, the present invention is directed to a method for accessing optical fibers disposed within an optical fiber cable having reinforcing rods embedded within an outer jacket.

2. Discussion of Related Art

In one type of optical fiber cable, a plurality of optical fibers are disposed within a buffer tube which is centrally disposed in a jacket. From time to time it is desirable to gain access to the optical fibers at a point along the cable in order to permit testing of the optical fibers or in order to make splices to the optical fibers. In order to access the optical fibers, a portion of the outer jacket and the buffer tube must be removed without damaging the optical fibers.

Prior art methods of accessing the optical fibers have used a special tool. Examples of such special tools are disclosed in U.S. Pat. Nos. 5,140,751, 4,434,554, 5,443,536, 5,093,992, 5,050,302, 4,972,581, and 5,359,690. In general, these special tools are formed by a housing having a channel or groove through which the optical fiber cable or buffer tube is permitted to pass. A blade, connected to the housing, extends into the channel or groove, as the case may be, so that the blade contacts the material covering the optical fiber, but not the optical fiber itself. As the housing and blade are moved relative to the cable, the blade cuts the covering in order to expose the optical fibers disposed therein.

There currently is a trend to make such fibers more accessible in a cable. This trend has led to the design and manufacture of cables that have no buffer tube, i.e., the fibers are disposed in a jacket that contains strength members. In view of the trend to permit easy access to optical fibers, it is desirable to provide a method that does not require a special tool.

SUMMARY OF THE INVENTION

Accordingly, it is an object of the present invention to provide a method of removing a portion of the outer jacket of an optical fiber cable without the use of special tools. The foregoing objective is realized by the present invention which comprises a method for accessing optical fibers in the midspan region of an optical fiber cable. The method of the present invention begins by providing an optical fiber cable having at least one optical fiber disposed within a channel defined by a jacket, the jacket having two reinforcing rods embedded therein. Next, the jacket material adjacent to the reinforcing rods is removed to partially expose the reinforcing rods. Then, the jacket material is cut substantially semi-circumferentially between the reinforcing rods at a leading position. Finally, the jacket material is pulled at the leading position radially away from the cable so as to cause the jacket material disposed between the reinforcing rods and the channel to separate. This permits access to the optical fibers disposed in the jacket through an opening resulting from the separation of the jacket material.

If desired, another cut can be made in the jacket material to limit the separation of the jacket material. Accordingly, a substantially semi-circumferential cut is made between the reinforcing rods at a trailing position that is longitudinally displaced from the leading position. Afterwards, the step of pulling the jacket material at the leading position is performed until the jacket material disposed between the leading position and the trailing position and between the reinforcing rods and the channel is separated.

Other objects and advantages of the present invention will become apparent to those skilled in the art from the following detailed description read in conjunction with the attached drawings and claims appended hereto.

BRIEF DESCRIPTION OF THE DRAWINGS

For a fuller understanding of the nature and objects of the invention, reference should be made to the following detailed description taken in conjunction with the accompanying drawings, in which:

FIG. 4 is a perspective side view of the optical fiber cable after the jacket material adjacent to portions of the reinforcing rods has been removed;

FIG. 5 is a cross sectional view of a slice of the optical fiber cable shown in FIG. 4 between the line 5—5 and the line A—A;

FIG. 10 is a perspective side view of the optical fiber cable once the jacket material between the leading position and the trailing position has been removed; and FIG. 11 is a cross sectional view of a slice of the optical fiber cable shown in FIG. 10 between the line 11—11 and the line A—A.

DETAILED DESCRIPTION OF THE INVENTION

Figure 1:
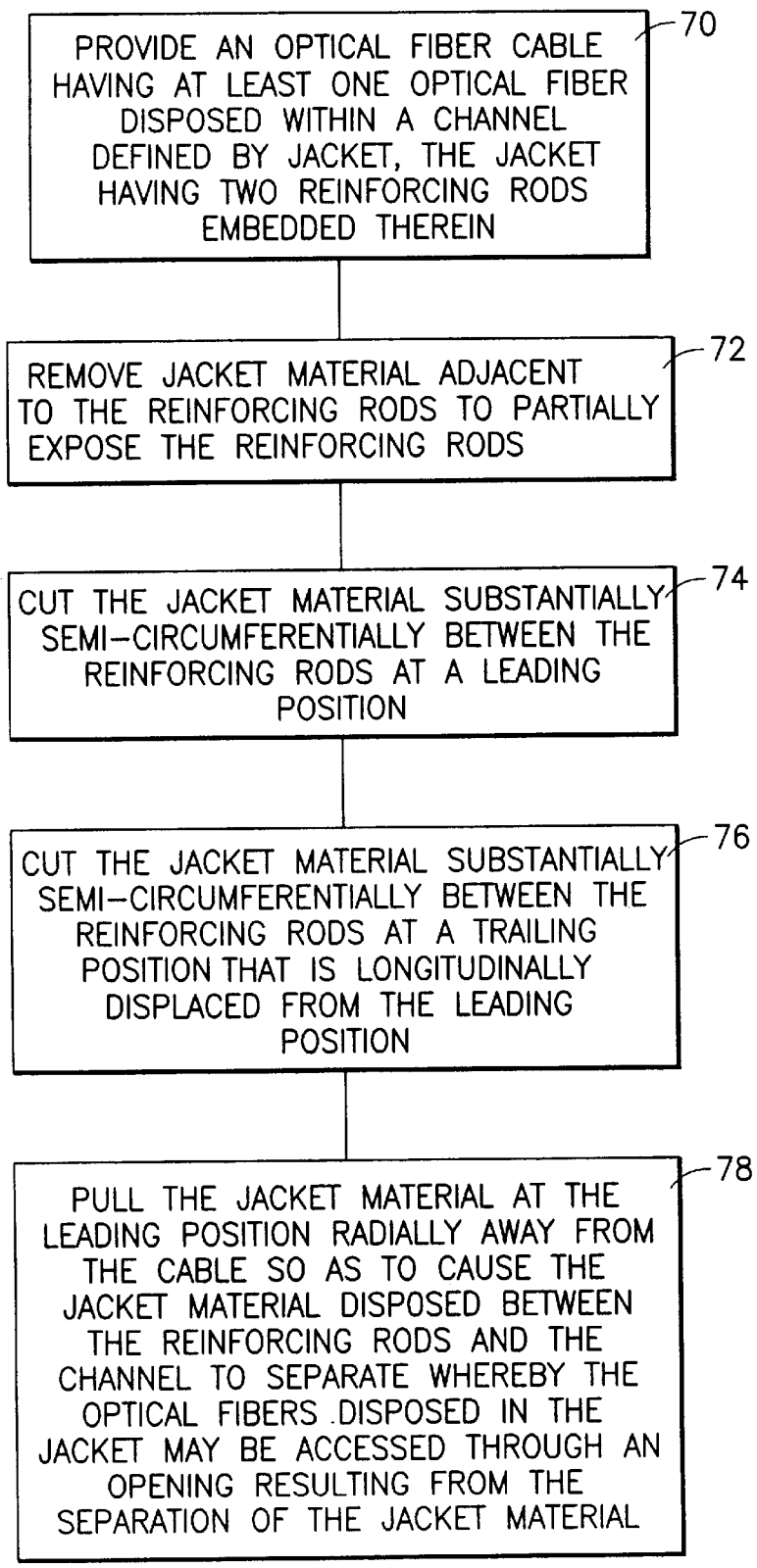
FIG. 1 is a flow chart showing the steps of the method according to the present invention.
Figure 2:
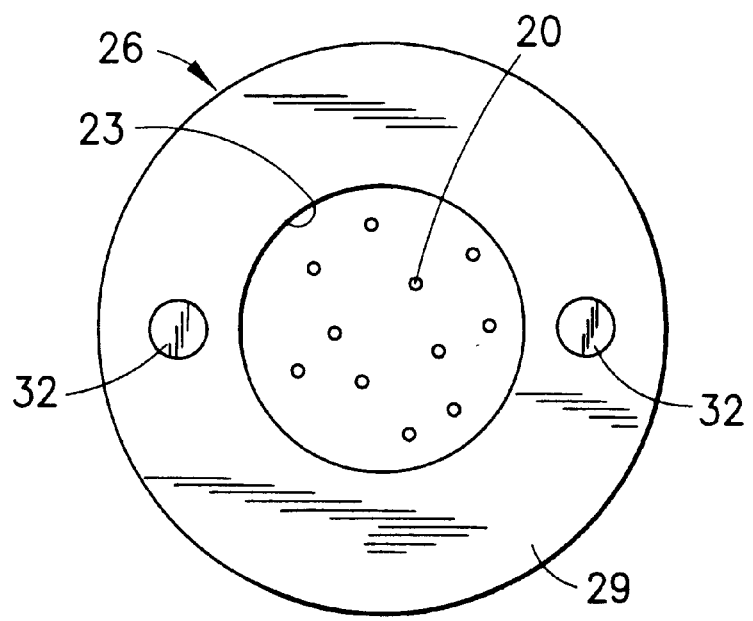
FIG. 2 is an end view of the optical fiber cable.

As shown in FIG. 1, the method of the present invention begins by providing an optical fiber cable 26 similar to that illustrated in FIG. 2 (step 70). The optical fiber cable 26 so provided has at least one optical fiber 20 disposed within a channel 23 defined by an outer jacket 29. The outer jacket 29 has two reinforcing rods 32 embedded therein.

Figure 3:
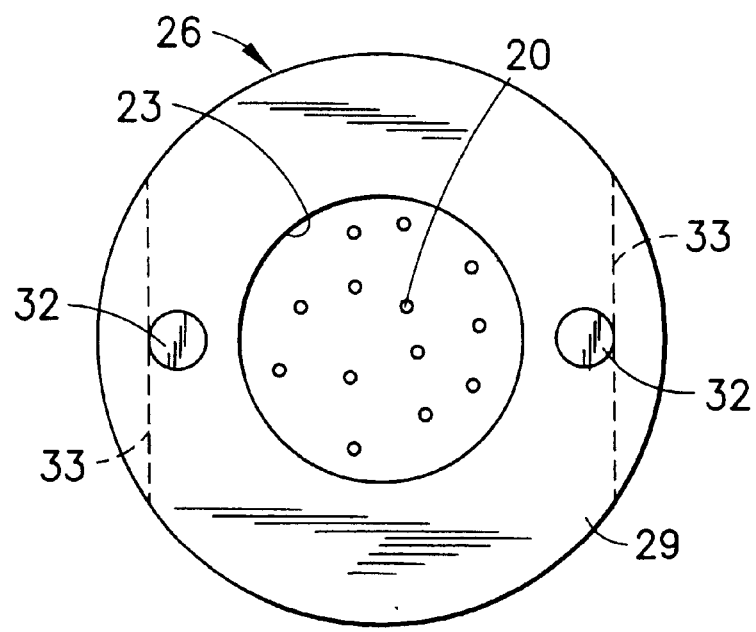
FIG. 3 is an end view of the optical fiber cable showing the position of cuts made in the jacket material to facilitate removal of the jacket material adjacent to portions of the reinforcing rods.
Figure 6:
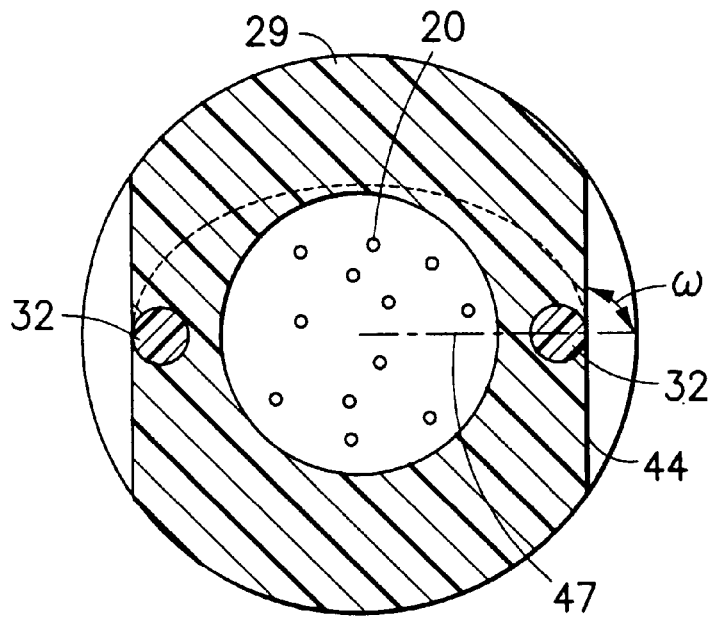
FIG. 6 is a cross-sectional view showing an orientation of the surfaces created once the jacket material adjacent to portions of the reinforcing rods has been removed.
Figure 7:
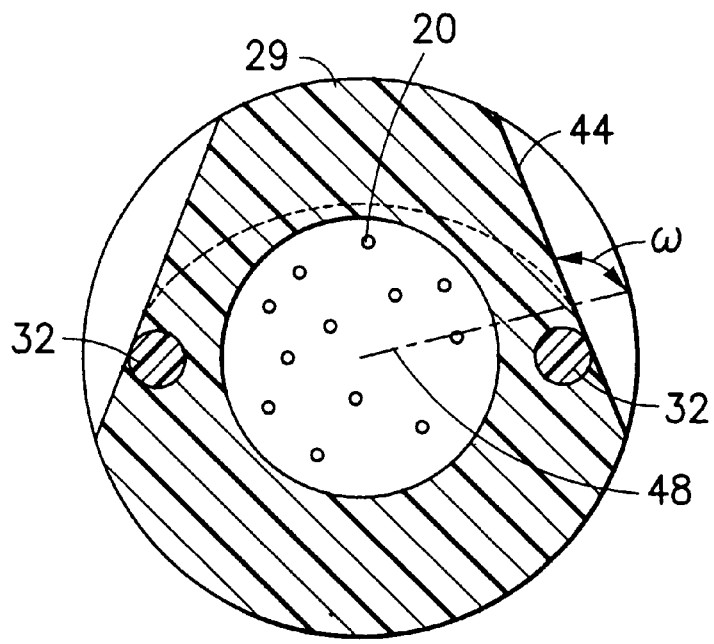
FIG. 7 is a cross-sectional view showing another orientation of the surfaces created once the jacket material adjacent to portions of the reinforcing rods has been removed.

Next, jacket material adjacent to each of the reinforcing rods 32 is removed by cutting with a knife, for example, to partially expose the reinforcing rods 32 as illustrated in FIGS. 3 through 7 (step 72). FIG. 3 shows the optical fiber cable 26 with the cuts 33 in the outer jacket 29 adjacent to each of the reinforcing rods 32. In FIGS. 4 and 5, the jacket material adjacent to the reinforcing rods 32 has been removed. As shown in FIG. 6, when the jacket material adjacent to a reinforcing rod 32 is removed to partially expose the reinforcing rod 32, the newly exposed surface 44 defines a plane which is oriented at an angle ω with respect to a radius 47 of the cable 26 passing through the reinforcing rod 32. In FIG. 6, the angle ω is about 90 degrees, and so the newly exposed surface 44 defines a plane which is substantially perpendicular to the radius 47. Alternatively, as shown in FIG. 7, the jacket material adjacent to the reinforcing rod 32 may be removed such that the newly exposed surface 44 defines a plane which is substantially perpendicular to a radius 48 of the cable 26 which does not pass through the reinforcing rod 32. Although FIG. 6 and FIG. 7 both show each of the reinforcing rods 32 being exposed by removal of jacket material in a similar manner, it should be noted that one of the reinforcing rods can be exposed as shown in FIG. 6 while the other reinforcing rod is exposed as shown in FIG. 7.

Figure 8:
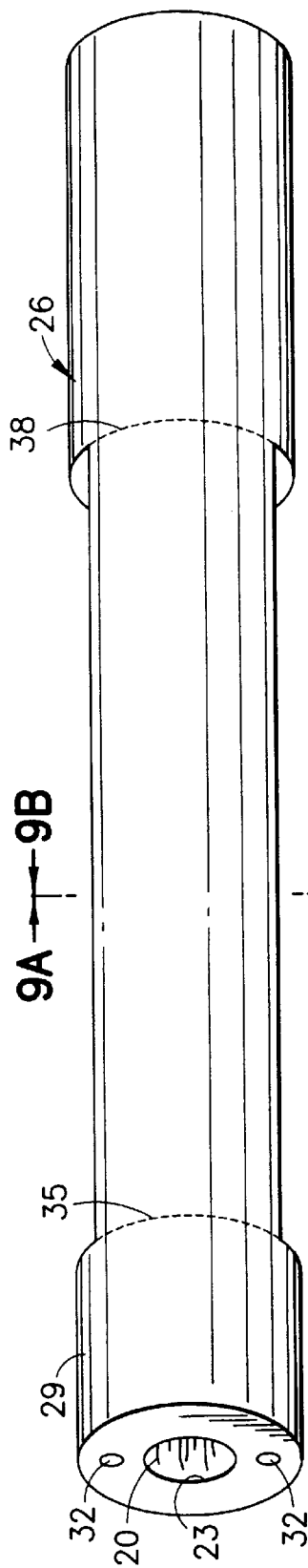
FIG. 8 is a perspective side view of the optical fiber cable once the cuts at the leading position and the trailing position have been made.

After the jacket material adjacent to the reinforcing rods is removed, the outer jacket 29 is cut substantially semi-circumferentially between the reinforcing rods 32 at a leading position 35 as shown in FIG. 8 (step 74). While making the cut at the leading position 35, the knife is inserted into the outer jacket 29 preferably substantially radially, and in order to prevent contact between the knife and the optical fiber 20, the knife preferably does not extend completely through the outer jacket 29 into the channel 23. In FIGS. 8 and 9A, the cut at the leading position 35 has been made in the outer jacket 29.

Figure 9B:
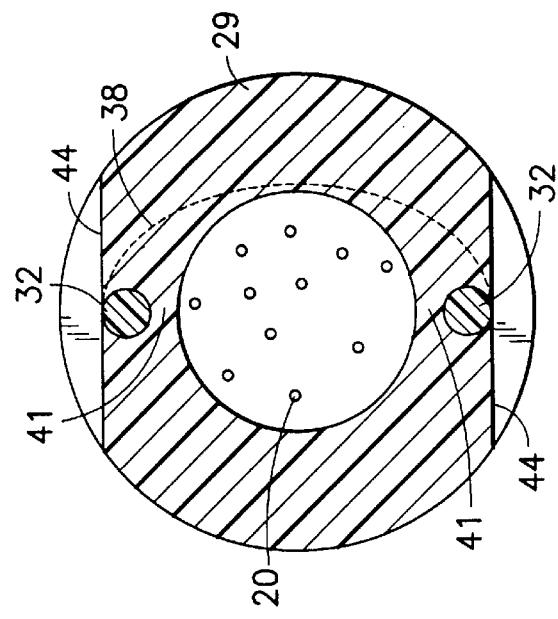
FIGS. 9A and 9B are cross sectional views of the optical fiber cable shown in FIG. 8 indicated by the line 9A—9A and 9B—9B respectively.
Figure 9A:
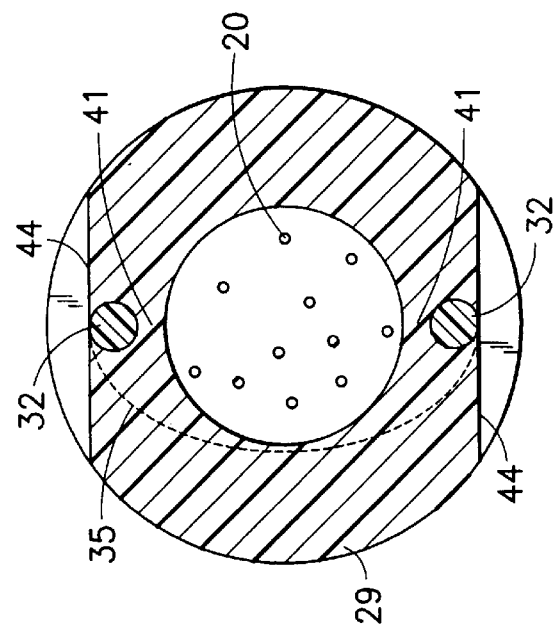

Finally, the outer jacket 29 is pulled at the leading position 35 radially away from the cable 26 so as to cause the jacket material disposed between the reinforcing rods 32 and the channel 23 to separate at a location 41 shown in FIGS. 9A and 9B (step 78). This will permit access to the optical fibers 20 through an opening resulting from the separation of the outer jacket 29. FIGS. 10 and 11 show the cable 26 with the optical fibers 20 exposed.

Optionally, as described in FIG. 1, a substantially semi-circumferential cut can be made between the reinforcing rods 32 at a trailing position 38 (shown in FIGS. 8 and 9B) that is longitudinally displaced from the leading position 35 (step 76). While making the cut at the trailing position 38, the knife is inserted into the outer jacket 29 preferably substantially radially, and in order to prevent contact between the knife and the optical fiber 20, the knife preferably does not extend completely through the outer jacket 29 into the channel 23. If such a cut is made, the pulling of the jacket material at the leading position 35 is performed until the outer jacket 29 disposed between the leading position 35 and the trailing position 38 and between the reinforcing rods 32 and the channel 23 is separated.

Although the present invention has been described with respect to one or more particular embodiments of the device, it will be understood that other embodiments of the present invention may be made without departing from the spirit and scope of the present invention. Hence, the present invention is deemed limited only by the appended claims and the reasonable interpretation thereof.

What is claimed is:

1. A method for accessing optical fibers in the midspan region of an optical fiber cable, the method comprising the steps of:
    (a) providing an optical fiber cable having at least one optical fiber disposed within a channel defined by a jacket, the jacket having two reinforcing rods embedded therein;
    (b) removing jacket material adjacent to the reinforcing rods to partially expose the reinforcing rods;
    (c) cutting the jacket material substantially semi-circumferentially between the reinforcing rods at a leading position;
    (d) pulling the jacket material at the leading position radially away from the cable so as to cause the jacket material disposed between the reinforcing rods and the channel to separate; and
    whereby the optical fibers disposed in the jacket may be accessed through an opening resulting from the separation of the jacket material.

2. The method of claim 1 further comprising:
    (e) cutting the jacket material substantially semi-circumferentially between the reinforcing rods at a trailing position that is longitudinally displaced from the leading position and wherein the step of pulling the jacket material at the leading position is performed until the jacket material disposed between the leading position and the trailing position and between the reinforcing rods and the channel is separated.

3. The method of claim 1 wherein the step of removing jacket material adjacent to the reinforcing rods to partially expose the reinforcing rods is performed such that the jacket material adjacent to one of the reinforcing rods is removed along a plane which is substantially perpendicular to a radius of the cable passing through said one of the reinforcing rods.

4. The method of claim 1 wherein the step of removing jacket material adjacent to the reinforcing rods to partially expose the reinforcing rods is performed with respect to each of the respective reinforcing rods such that the respective jacket material adjacent to the respective reinforcing rods is removed along respective planes which are substantially perpendicular to respective radii of the cable passing through the respective reinforcing rods.

5. The method of claim 1 wherein the step of removing jacket material adjacent to the reinforcing rods to partially expose the reinforcing rods is performed such that the jacket material adjacent to one of the reinforcing rods is removed along a plane which is substantially perpendicular to a radius of the cable which does not pass through said one of the reinforcing rods.

6. The method of claim 1 wherein the step of removing jacket material adjacent to the reinforcing rods to partially expose the reinforcing rods is performed with respect to each of the respective reinforcing rods such that the respective jacket material adjacent to the respective reinforcing rods is removed along respective planes which are substantially perpendicular to respective radii of the cable which do not pass through the respective reinforcing rods.

7. A method for accessing optical fibers in the midspan region of an optical fiber cable, the method comprising the steps of:
    (a) providing an optical fiber cable having at least one optical fiber disposed within a channel defined by a jacket, the jacket having two reinforcing rods radially opposed to each other and embedded within the jacket;
    (b) removing jacket material adjacent to the reinforcing rods to partially expose the reinforcing rods;
    (c) cutting the jacket material substantially semi-circumferentially between the reinforcing rods at a leading position;
    (d) pulling the jacket material at the leading position radially away from the cable so as to cause the jacket material disposed between the reinforcing rods and the channel to separate; and
    whereby the optical fibers disposed in the jacket may be accessed through an opening resulting from the separation of the jacket material.

8. The method of claim 7 further comprising a step of cutting the jacket material substantially semi-circumferentially between the reinforcing rods at a trailing position that is longitudinally displaced from the leading position and performing the step of pulling the jacket material at the leading position until the jacket material disposed between the leading position and the trailing position and between the reinforcing rods and the channel is separated.

9. The method of claim 7 wherein the step of removing jacket material adjacent to the reinforcing rods to partially expose the reinforcing rods is performed such that the jacket material adjacent to one of the reinforcing rods is removed along a plane which is substantially perpendicular to a radius of the cable passing through said one of the reinforcing rods.

10. The method of claim 7 wherein the step of removing jacket material adjacent to the reinforcing rods to partially expose the reinforcing rods is performed with respect to each of the respective reinforcing rods such that the respective jacket material adjacent to the respective reinforcing rods is removed along respective planes which are substantially perpendicular to respective radii of the cable passing through the respective reinforcing rods.

11. The method of claim 7 wherein the step of removing jacket material adjacent to the reinforcing rods to partially expose the reinforcing rods is performed such that the jacket material adjacent to one of the reinforcing rods is removed along a plane which is substantially perpendicular to a radius of the cable which does not pass through said one of the reinforcing rods.

12. The method of claim 7 wherein the step of removing jacket material adjacent to the reinforcing rods to partially expose the reinforcing rods is performed with respect to each of the respective reinforcing rods such that the respective jacket material adjacent to the respective reinforcing rods is removed along respective planes which are substantially perpendicular to respective radii of the cable which do not pass through the respective reinforcing rods.

* * * * *